US00RE35958E

United States Patent [19]

Hacias

[11] E Patent Number: Re. 35,958

[45] Reissued Date of Patent: Nov. 17, 1998

[54] METHOD OF FORMING PHOSPHATE COATING ON ZINC

[75] Inventor: Kenneth J. Hacias, Sterling Heights, Mich.

[73] Assignee: Henkel Corporation, Plymouth Meeting, Pa.

[21] Appl. No.: 344,839

[22] Filed: Nov. 23, 1994

Related U.S. Patent Documents

Reissue of:

[64] Patent No.: 4,595,424
Issued: Jun. 17, 1986
Appl. No.: 769,433
Filed: Aug. 26, 1985

U.S. Applications:

[63] Continuation of Ser. No. 209,113, Jun. 17, 1988, abandoned.

[51] Int. Cl.[6] ..... C23C 22/12; C23C 22/18

[52] U.S. Cl. ..... 148/262

[58] Field of Search ..... 148/262

[56] References Cited

U.S. PATENT DOCUMENTS

| | | | |
|---|---|---|---|
| 2,312,855 | 3/1943 | Thompson | 148/202 |
| 2,835,617 | 5/1958 | Maurer | 148/262 |
| 3,109,757 | 11/1963 | Reinhold | 148/262 |
| 3,617,393 | 11/1971 | Nakagawa | 148/262 |
| 3,681,148 | 8/1972 | Wagerknecht | 148/262 |

FOREIGN PATENT DOCUMENTS

| | | | |
|---|---|---|---|
| 2818426 | 11/1978 | Germany | 148/262 |
| 1415999 | 5/1974 | United Kingdom | 148/262 |
| 2137231 | 3/1984 | United Kingdom . | |
| 2148951 | 10/1984 | United Kingdom . | |

OTHER PUBLICATIONS

EP 0019430 Nov. 1980.
Lange, Handbook of Chemistry pp. 784,785 1952.

*Primary Examiner*—Sam Silverberg
*Attorney, Agent, or Firm*—Wayne C. Jaeschke; Norvell E. Wisdom, Jr.; Patricia S. Rogowski

[57] ABSTRACT

Disclosed is an improved method for coating a zinc surface comprising treating said surface with an aqueous, acidic solution containing:

(a) about 0.5 to about 4 percent phosphate ion;

(b) an ion selected from the group consisting of zinc ions, manganese ions, and mixtures thereof, said ions being present at a level sufficient to form dihydrogen phosphate with substantially all of said phosphate ions; and (c) about 0.01 to about 1 percent complex fluoride ions; wherein the weight:weight ratio of complex fluoride ions:chloride ions in said solution is at a value of about 8:1 or greater.

It is preferred that the ratio complex of fluoride ion to chloride ion ($F^-$:$Cl^-$) in said solution to be maintained at a value of greater than about 8:1, preferably greater than about 10:1, and more preferably greater than about 14:1. The select weight:weight complex fluoride:chloride ratio substantially eliminates the abnormal crystal growth frequently found in treated surfaces while at the same time reduces the need for excess fluoride.

50 Claims, No Drawings

METHOD OF FORMING PHOSPHATE COATING ON ZINC

Matter enclosed in heavy brackets [ ] appears in the original patent but forms no part of this reissue specification; matter printed in italics indicates the additions made by reissue.

*This reissue application is a continuation of reissue application No. 07/209,113, filed Jun. 17, 1988, now abandoned, which is a reissue application No. 07/769,433, filed Aug. 26, 1985, now U.S. Pat. No. 4,595,424.*

The present invention relates to an improved method for forming adherent, corrosion resistant, deformation/paint base-protective coatings on zinc surfaces, and to materials for forming such coatings. The method is particularly useful for coating galvanized surfaces.

BACKGROUND OF THE INVENTION

Aqueous acidic solutions which are useful in forming phosphate coatings on zinc surfaces are well known. Certain of these solutions have achieved widespread commercial use. Such solutions typically include the phosphate ion, the zinc or manganese ion and typically one or more of the following ions: nickel, cobalt, copper, nitrate, nitrite, fluoroborate or silicofluoride. The art has been able to form phosphate coatings on zinc since about 1917, and there have been successive discoveries of the effects of the nitrate, copper, nickel, fluoborate, and silicofluoride ions on the coating ability of such solutions made through the years. Presently, galvanized metal surfaces are effectively provided with a deformation or paint base protective phosphate coating by being treated in the following manner: (1) pretreatment steps which generally include a rinsing or cleaning step and an activation step; (2) a phosphate coating step; and (3) post-treatment steps including a general rinse step and a sealing rinse step. Such processes and solutions for forming conversion coatings on metal surfaces are well known and have been described, for example, in Metal Handbook, Volume II, 8th Edition, pages 529–547 of the American Society for Metals and in Metal Finishing Guidebook and Directory, pages 590–603 (1972), the contents of both of which are specifically incorporated herein by reference. Despite the advances, the best present day formulations are troublesome in certain respects.

For example, certain types of paint applied over the art-disclosed coatings develop a roughness which is referred to as hazing, and the gloss is not of the highest order. Moreover, painted surfaces subjected to bending do not resist flaking, cracking and the like to the commercially desired degree.

Another problem associated with such coatings, particularly when they are deposited on galvanized surfaces, is known as "white specking" or "nubbing". This phenomenon can best be described as uncontrolled crystal growth at pinpoint locations. This growth results in a flawed, rough surface. The specks appear as large white growths; they are generally zinc or zinc/iron phosphate crystals. While they can vary greatly in size, they are typically 50–150μ wide and 100–400μ high.

The larger crystal growths are apparent to the naked eye from virtually any angle. The smaller growths can only be seen with some magnification. However, when the treated or coated metal surface is painted, such flaws are immediately apparent and the resulting product is frequently unacceptable. A uniform paint film cannot be applied; this is true whether the paint is applied by spray or electrodeposition. The "white specking" has been observed to occur during both the pre-treatment and treatment stages. However, it most commonly appears during the treatment stage.

There have been many attempts to effectively solve this problem of coating zinc surfaces, particularly galvanized surfaces; all such attempts have focused on the treatment steps. Two of the most effective are disclosed in U.S. Pat. No. 3,240,633, issued Mar. 15, 1966, to Gowman, et al., and U.S. Pat. No. 2,835,617, issued May 20, 1958, to Maurer; both of which are expressly incorporated herein by reference. These methods primarily involve the introduction of fluoride and ferric ion into the bath.

These references clearly suggest that the use of fluoride ion in the treatment bath assists in preventing the formation of "white specks" or "nubbing" under most conditions. However, it has also been observed that this method is not always effective in completely preventing the abnormal crystal growth, particularly when economical and environmentally sound levels of fluoride are used; the inclusion of additional fluoride being undesirable from both an economic and environmental standpoint.

It has now been discovered that while fluoride ion introduction has been viewed as usually effective in preventing the abnormal crystal growth, it is in fact the presence of chloride ion which causes the "white specking" or "nubbing". Further, an increase in chloride ion without a corresponding increase in fluoride ion will increase the frequency and severity of white specking. It will be appreciated that the art heretofore was wholly indiscriminate with regard to chloride level and the ratio of chloride to fluoride.

It is commercially impractical if not impossible to remove all chloride ions from such processes. This is a result of the many sources of such ions, including, for example: reaction products of chlorate accelerators, and other impurities; intentionally added salts such as the ferric chloride as suggested in U.S. Pat. No. 3,240,633 (discussed above); inert sodium chloride and other similar bulking or anti-caking agents and additives; make-up water, and the like.

Accordingly, the present invention relates to a method for providing an improved phosphate coating on zinc surfaces. The improvement comprises employing solutions and baths with a select fluoride:chloride ratio.

SUMMARY OF THE INVENTION

The present invention relates to an improved method for coating a zinc surface comprising treating said surface with an aqueous, acidic solution containing:

(a) about 0.5 to about 4 percent phosphate ion;

(b) an ion selected from the group consisting of zinc ions, manganese ions, and mixtures thereof, said ions being present at a level sufficient to form dihyrogen phosphate with substantially all of said phosphate ions; and (c) about 0.01 to about 1 percent complex fluoride ions; wherein the weight:weight ratio of complex fluoride ions:chloride ions in said solution is at a value of about 8:1 or greater.

It is preferred that the ratio of complex fluoride ion to chloride ion ($F^-$:$Cl^-$) in said solution to be maintained at a value of greater than about 8:1, preferably greater than about 10:1, and more preferably greater than about 14:1. The select weight:weight complex fluoride:chloride ratio substantially eliminates the abnormal crystal growth frequently found in treated surfaces while at the same time reduces the need for excess fluoride.

DETAILED DESCRIPTION OF THE INVENTION

As will be appreciated from the above discussion, it has now been discovered that the "white specking" or "nabbing" imperfections present in galvanized phosphate coatings are attributable to the presence of certain chloride levels in the coating solution. Accordingly, the present invention relates to a method which solves this problem, maximizing the effect of the fluoride while minimizing the ultimate level of fluoride employed. This solution is achieved by employing a select complex fluoride ion:chloride ion ratio in the process. Lastly, it has been discovered that it is also desirable to employ low chloride levels in all pre-treatment steps and in all pre-treatment agents. This prevents "white specking" from occurring in the pre-treat stages and from contaminating treatment bath with chloride ion carried over from the pre-treatment stage.

In the practice of the present invention, it is important to control chloride level at the pre-treatment stage and the weight:weight ratio of complex fluoride ion:chloride ion must be carefully controlled in the treatment stage, i.e., the application of the improved deformation/paint base protective phosphate coating itself.

Accordingly, the solutions employed in the treatment steps of the present invention for applying the improved phosphate coating are aqueous and acidic. They employ phosphate ions and generally comprise about 0.5 percent to about 4 percent of the phosphate ions. More preferably, the phosphate is present at a level of about 0.5 to about 2.5 percent, and still more preferably about 0.5 to about 2.0 percent.

The treatment solutions employed in the practice of the present invention for applying the improved phosphate coating also contain at least one ion selected from the group consisting of zinc ions and manganese ions. The selected zinc or manganese ion is preferably employed at a level at least sufficient to form dihydrogen phosphate with the phosphate employed.

The treatment solutions employed in the practice of the present invention for applying the improved phosphate coating optionally contain nitrate ions. Nitrate ions are preferably present at a level of about 0.025 to about 2 percent, and more preferably about 0.05 to about 1 percent. It will be appreciated that some level of nitrate ion will be generated in the coating step of the present invention even if it is not added. However, controlled addition is preferred.

The phosphate and nitrate discussed above may be added to or introduced into the solution from any conventional source.

The treatment solutions employed in the practice of the present invention for applying the improved phosphate coating optionally contain at least one ion selected from the group consisting of nickel ions and cobalt ions. In a preferred embodiment, the ion selected from this group is employed at a level of about 0.01 percent to about 1 percent.

The nickel or cobalt ions may be introduced as salts such as the sulfate, phosphate, carbonate or nitrate salts, preferably as the carbonate salt.

The treatment solutions employed in the practice of the present invention for applying the improved phosphate coating contain about 0.01 to about 3 percent complex fluoride ion. More preferably, the complex fluoride ion is present at a level of about 0.025 to about 0.25 percent. It will be appreciated that the higher the ratio of zinc surface to steel surface to be treated, the higher the desirable fluoride level. Thus, for example, when treating galvanized surfaces (greater than 50 percent), levels of about 0.05 to about 0.2, and more preferably about 0.075 to about 0.2, and still more preferably 0.08 to about 0.15, are employed. These levels are preferably measured by employing a fluoride sensitive electrode such as one manufactured by Orion.

The complex fluoride ion may be added to or introduced into the solution from any conventional source, including those discussed in U.S. Pat. No. 2,835,617, issued to Maurer, on May 20, 1958, and U.S. Pat. No. 3,240,633, issued to Gowman, et al., on Mar. 15, 1966, the disclosure of both being expressly incorporated herein by reference. While free fluoride ion may be employed under certain circumstances, it is preferred that the fluoride ion be a complex (or complexed) fluoride ion. In a highly preferred embodiment, the complex fluoride ion may be introduced as silico fluoride. The silico fluoride ion provides especially superior results when used on continuous hot dip zinc surfaces, and since they are readily available commercially and provide both the necessary fluoride concentration and concurrently supply other beneficial ions, it may be, in many instances, much more desirable to formulate the compositions with silico fluoride as the starting materials rather than, for example, free fluoride ion sources such as hydrofluoric acid.

The solutions to be employed in the present invention maintain a weight:weight ratio of complex fluoride ion:chloride ion ($F^-$(complex):$Cl^-$) of greater than about 8:1, and more preferably about 10:1. In a highly preferred embodiment, the solutions employed maintain a fluoride ion:chloride ion ratio of greater than about 14:1.

In order to effectively reduce the necessary level of fluoride ion, it is desirable that the treatment solutions of the present invention contain a maximum chloride ion level less than that which causes any noticeable or observable interference with the application of a uniform coating, i.e., "white specking" or "nubbing". In a highly preferred embodiment, the treatment solutions contain less than about 50 parts per million chloride ion. This can be most efficiently accomplished by maintaining a chloride level of less than about 0.0050 percent chloride ion in substantially all of the use solution employed in the practice of the present invention.

It will be appreciated from the above discussion that since it is the presence of the chloride ion which interferes with the ultimate quality of the coating, it is desirable to maintain a chloride ion level which is as far below 50 ppm as is practical. This also reduces the necessary level of complex fluoride. Accordingly, it is preferred that the chloride level in the use solution be reduced to about 30 ppm or 0.003 percent, and more preferably about 20 ppm or 0.002 percent. In a highly preferred embodiment, the use solution is substantially free of chloride ions, i.e., contain less than about 15 ppm or 0.0015 percent.

The treatment solutions employed in the present invention for applying the improved phosphate coating optionally contain ferric ($Fe^{+++}$) ion. In a preferred embodiment, the ferric ion is present at a level of at least about 0.0015. The ferric ion may be added to or introduced into the solution from the workpiece or substrate, or from any conventional source; the ferric ion may be introduced into the solutions in the form of any of the conveniently available ferric salts which contain anions that are not detrimental to the coating forming ability of the solution. For example, this would include ferric acid phosphate, ferric nitrate, ferric fluoride, or ferric fluoborate. The source of ferric ion may also be introduced from the workpiece or part or added as a ferrous ($Fe^{++}$) salt or ferrous ion if an oxidizing agent is also added which will oxidize the ferrous ion to the ferric state, such as hydrogen peroxide, permanganate, nitrite, nitrate, etc.

It should be noted that ferrous chloride and ferric chloride may be employed as the source of the ferric ion. However, as will be appreciated from the discussion of the chloride ion level and complex fluoride:chloride ratios that must be maintained in the practice of the present invention, the use of iron chlorides, or chloride salts of any of the required or optional cations, must be vary carefully managed.

The preferred ferric ion concentration is a level of ferric ion which approaches or is at the saturation value.

It has been noted in the art that the incorporation of the ferric ion in the aqueous acidic solutions such as those similar to the present invention is effective to substantially reduce the coating weight which is obtained over a wide range of solution acidities. It has also been noted by the art that solutions having total acid values in the range of about 10 to about 110 points are effective to form adherent protective coatings and are improved by the addition of the ferric ion. Points of total acid refers to the number of ml. of N/10 NaOH required to titrate a 10 ml. sample of the solution to a phenolphthalein end point.

The solutions of this invention may be applied to the surface to be coated by spraying, roller coating, by atomizing the solution on a preliminarily heated zinc surface or by dipping the part to be coated in a tank containing the use solution. Solutions will form coatings in the range of about 110° F. to the boiling point of the solution but are preferably operated in the range of about 130° F. to 180° F. with the best overall results being obtained with solutions at about 150° F. for spray, roller coating, or atomizing, and 110°–130° F. for dip application.

As noted in the above discussion, the problem of white specking can occur even during the pre-treatment stages if the chloride level is high enough. Further, if the chloride levels are high in the pretreatment stage, the "carry-forward" of chloride ion into the treatment stage can result in contamination of an otherwise acceptable treatment bath. Accordingly, this invention relates to a method for employing pre-treatment solutions and agents, such as cleaners, conditioners, activators, cleaner/conditioner combinations, and the like, which contain a level of chloride below which such chloride causes noticeable or observable interference with the application of a uniform coating. In a preferred embodiment, pre-treatment solutions, agents, and reconstituted concentrates are substantially free of chloride ion. In a highly preferred embodiment, such materials contain less than about 100 ppm chloride ion, and more preferably less than about 50 ppm chloride ion.

For example, it is common in the art to employ a "conditioning rinse" which contains titanium phosphate in the coating of zinc surfaces. Such conditioning rinses are frequently commercially prepared by the neutralization of titanium sulphate with caustic (NaOH), followed by phosphoric acid, etc. Because most commercial grade caustics contain high chloride levels, the resulting conditioning rinses are extremely high (frequently above 400 ppm) in chloride. Further, because the conditioning rinse frequently comes into direct contact with the surface being treated in a somewhat concentrated form, the high chloride levels cause "white specking" or "nubbing".

In the practice of the present invention, therefore, it is preferred that all concentrates, additives, replenishers, rinses, or combination agents which perform two or more of these functions, and the like, be prepared, selected, or used in such a fashion that the combination results in the use solution possessing a chloride ion concentration below which such chloride causes noticeable or observable interference with the application of a uniform coating.

In a highly preferred embodiment, the methods of the present invention employ a titanium or high phosphate rinse solution having a chloride ion concentration less than about 50 ppm chloride ion.

It may also be desirable and preferred to perform certain other select steps both prior to and after the application of the improved phosphate coating. For example, it may be advantageous to take steps to see that the part or workpiece to be coated is substantially free of grease, dirt, particulate matter and the like by employing conventional cleaning procedures and materials. These would include, for example, mild or strong alkali cleaners, acidic cleaners, and the like. Such cleaners are generally followed and/or proceeded with a water rinse.

It has also been found to be advantageous to employ pre-treatment solutions following the cleaning steps such as that disclosed in U.S. Pat. Nos. 2,310,239, 2,874,081, and 2,884,351 (all of which are expressly incorporated herein by reference) which pre-treatment solutions are of the general type which contain a condensed phosphate and a small quantity of the titanium or zirconium ion.

In a highly preferred embodiment, such materials and other pre-treatment materials, possess a level of chloride ion below which such chloride causes noticeable or observable interference with a uniform coating or are sufficiently rinsed from the part or workpiece so that high levels of chloride ion are not introduced into the treatment solution next employed.

After the coating is formed by application of the solution of this invention, it is advantageous, particularly in those cases in which the coated surface is to be subsequently painted, to rinse the coating in a dilute aqueous chromic acid solution of conventional constituency, for example, one containing about 0.025 to 0.1% chromium ion as $Cr^{+3}$, $Cr^{+6}$ or mixtures thereof. Another class of useful rinses which may be applied to the part or workpiece after the application of the coating are disclosed in U.S. Pat. Nos. 3,975,214; 4,376,000; 4,457,790; 4,039,353; and 4,433,015, all of which are expressly incorporated herein by reference. In summary, the post-treatment compound placed into the rinse is a poly-4-vinyl-phenol or the reaction product of poly-4-vinyl-phenol with an aldehyde or ketone.

After such a final chromic acid or poly-4-vinylphenol rinse, the coatings have good resistance to corrosion prior to the application of paint and when painted have been found to be more resistant to cracking, chipping and peeling when the painted surface is deformed such as by forming to final desired shape in dies, by bending or the like.

Other art-disclosed treatments useful for effecting the formation of an adherent, uniform phosphate coating on metal surfaces may also be employed in the processes of the present invention. See, for example, U.S. patent application Ser. No. 469,621 for "Improved Process for Producing Phosphate Coatings", filed Mar. 21, 1983.

By the term "substantially free of chloride ions" is meant that the pre-treatment material being described contains a chloride ion concentration below that which the chloride ion noticeably or visually interfere with a uniform phosphate coating by causing "white specking" during the pre-treatment steps or during the treatment itself.

The following examples are intended to illustrate the compositions and methods of this invention in somewhat greater detail but it is to be understood the the particular ingredients, the proportions of ingredients, and the conditions of operation do not define the limits of this invention which have been set forth above. Percent concentration throughout this specification and claims refers to percent weight/volume, unless otherwise indicated.

EXAMPLE 1

Galvanized panels were processed using an immersion zinc phosphate bath in the cycle outlined. Chloride and fluoride were gradually introduced into the zinc phosphate bath as solutions of "tap" water and sodium chloride or sodium silica fluoride, respectively. The chloride level was increased until "white specking" was observed at which point fluoride was then added until the white specking vanished. This cycle was then repeated using the previously altered zinc phosphate bath. To verify results, a fresh zinc phosphate bath was contaminated with an initial charge of chloride greater than necessary to produce "white specking" and fluoride added until the "specking" had vanished. Panels were then examined for coating weight, crystal size and coating appearance.

| Laboratory Process Cycle | |
|---|---|
| Stage 1 - Alkaline Cleaner: | |
| Conventional Cleaner Concentration | ½ ounce per gallon |
| Temperature | 140° F. |
| Time | 120 seconds spray |
| Stage 2 - Warm Water Rinse: | |
| Temperature | Ambient |
| Time | 100 seconds spray |
| Stage 3 - Titanium-containing Surface Conditioner: | |
| Concentration | 1.5 grams per liter; pH = 9.2; 15 p.p.m. Ti |
| Temperature | Ambient |
| Time | 100 seconds Immersion |
| Chloride concentration | less than 50 ppm |
| Stage 4 - Zinc Phosphate Bath: | |
| Concentration or Test | Free Acid - 1.0 points<br>Total Acid - 20.0–22.0 points<br>Accelerator - 3.0–3.5 points |
| Temperature | 130° F. |
| Time | 240 seconds Immersion |
| Stage 5 - Cold Water Rinse: | |
| Temperature | Ambient |
| Time | 100 seconds Immersion |
| Stage 6 - Oven Dry: | |
| Temperature | 250° F. |
| Time | 5 minutes |

TABLE 1

RESULTS
STAGE 4 BATH ANALYSIS

| Sample | Specking | Chloride | Fluoride | $F^-:Cl^-$ Ratio |
|---|---|---|---|---|
| Fresh | No | 32 ppm | 1000 ppm | 31.3:1 |
| After 0.34 Grams NACl | Slight | 80 ppm | 1100 ppm | 13.8:1 |
| After 0.6 Grams $Na_2SiF_6$ | No | 86 ppm | 1400 ppm | 16.3:1 |

TABLE 1-continued

RESULTS
STAGE 4 BATH ANALYSIS

| Sample | Specking | Chloride | Fluoride | $F^-:Cl^-$ Ratio |
|---|---|---|---|---|
| After 0.2 Grams NaCl | Slight | 108 ppm | 1200 ppm | 11.1:1 |
| After 0.6 Grams $Na_2SiF_6$ | No | 104 ppm | 1400 ppm | 13.5:1 |
| Fresh | No | <10 ppm | 900 ppm | — |
| After 0.8 Grams NaCl | Heavy | 104 ppm | 900 ppm | 8.6:1 |
| After 0.6 Grams $Na_2SiF_6$ | Slight | 104 ppm | 1000 ppm | 9.6:1 |
| After 3.34 Grams $Na_2SiF_6$ | No | 98 ppm | 1400 ppm | 14.3:1 |

What is claimed is:

1. An improved method for coating a zinc surface comprising treating said surface with an aqueous, acidic solution containing:
   (a) about 0.5 to about 4 percent phosphate ion;
   (b) an ion selected from the group consisting of zinc ions, manganese ions, and mixtures thereof, said ions being present at a level sufficient to form dihydrogen phosphate with substantially all of said phosphate ions; and
   (c) about 0.01 to about 1 percent complex fluoride ions; and
   (d) measuring the chloride ion concentration and maintaining the weight:weight ratio of complex fluoride ions:chloride ions in said solution at a value of about 8:1 or greater.

2. A method according to claim 1, wherein said solution additionally contains about 0.025 to about 2 percent nitrate ion.

3. A method according to claim 1 wherein said solution additionally contains about 0.01 to about 1 percent of an ion selected from the group consisting of cobalt ions, nickel ions, and mixtures thereof.

4. A method according to claim 1, wherein the ratio is maintained at a value of about 10:1 or greater.

5. A method according to claim 4 wherein the ratio is maintained at a value of about 14:1 or greater.

6. A method according to claim 1 wherein the phosphate ion is present at a level of about 0.5 to about 2.5 percent.

7. A method according to claim 4 wherein the phosphate ion is present at a level of about 0.5 to about 2.0 percent.

8. A method according to claim 2 wherein the nitrate ion is present at a level of about 0.05 to about 1 percent.

9. A method according to claim 1 wherein the chloride ion is present at a level of less than about 0.0050 percent.

10. A method according to claim 9 wherein the chloride ion is present at a level of less than about 0.0020 percent.

11. A method for coating a zinc surface comprising treating said surface with an aqueous acidic solution containing:
   (a) about 0.5 to about 4 percent phosphate ion;
   (b) about 0.025 to about 2 percent nitrate ion;
   (c) an ion selected from the group consisting of zinc ions, manganese ions, and mixtures thereof, said ions being present at a level sufficient to form dihydrogen phosphate with substantially all of said phosphate ions; and
   (d) about 0.01 to about 1 percent of an ion selected from the group consisting of cobalt ions, nickel ions, and mixtures thereof; wherein said solution contains less than about 0.0050 percent chloride ion; and (e) measuring the chloride ion concentration and maintaining the ratio of fluoride ions:chloride ions in said solution at a value of about 8:1 or greater.

12. A method according to claim 11 wherein the ratio is maintained at a value of about 10:1 or greater.

13. A method according to claim 12 wherein the ratio is maintained at a value of about 14:1 or greater.

14. A method according to claim 11 wherein the phosphate ion is present at a level of about 0.5 to about 2.5 percent.

15. A method according to claim 1 wherein all pretreatment steps are substantially free of chloride ions.

*16. A process for suppressing white specking when phosphate-coating a zinc surface, comprising:*

*contacting the zinc surface with an aqueous, acidic solution containing:*

*(a) about 0.5 to about 4 percent phosphate ion;*

*(b) an ion selected from the group consisting of zinc ions, manganese ions, and mixtures thereof;*

*(c) about 0.01 to about 1 percent complex fluoride ions; and*

*(d) chloride ions;*

*wherein the weight:weight ratio of complex fluoride ions:chloride ions in the solution is measured and maintained during coating at a value of about 8:1 or greater by adjusting the amount of complex fluoride ion in the composition thereby suppressing the white specking.*

*17. The process of claim 16 wherein the weight ratio of complex fluoride ions:chloride ions in the solution is maintained above about 10:1.*

*18. The process of claim 16 wherein the weight ratio of complex fluoride ions:chloride ions in the solution is maintained above about 14:1.*

*19. The process of claim 16 wherein the solution contains manganese ions.*

*20. The process of claim 17 wherein the solution contains manganese ions.*

*21. The process of claim 18 wherein the solution contains manganese ions.*

*22. The process of claim 16 wherein the solution contains from about 0.025 to about 2 percent of the solution of nitrate ions.*

*23. The process of claim 17 wherein the solution contains from about 0.025 to about 2 percent of the solution of nitrate ions.*

*24. The process of claim 18 wherein the solution contains from about 0.025 to about 2 percent of the solution of nitrate ions.*

*25. The process of claim 18 wherein the solution contains from about 0.01 to about 1 percent of the solution of an ion selected from the group consisting of cobalt ions, nickel ions, and mixtures thereof.*

*26. The process of claim 17 wherein the solution contains from about 0.01 to about 1 percent of the solution of an ion selected from the group consisting of cobalt ions, nickel ions, and mixtures thereof.*

*27. The process of claim 18 wherein the solution contains from about 0.01 to about 1 percent of the solution of an ion selected from the group consisting of cobalt ions, nickel ions, and mixtures thereof.*

*28. The process of claim 16 wherein the solution contains from about 0.5 to about 2.5 percent of phosphate ions.*

*29. The process of claim 17 wherein the solution contains from about 0.5 to about 2.5 percent of phosphate ions.*

*30. The process of claim 18 wherein the solution contains from about 0.5 to about 2.5 percent of phosphate ions.*

*31. The process of claim 16 wherein the solution contains less than about 0.005 percent of chloride ions.*

*32. The process of claim 17 wherein the solution contains less than about 0.005 percent of chloride ions.*

*33. The process of claim 18 wherein the solution contains less than about 0.005 percent of chloride ions.*

*34. The process of claim 22 wherein the solution contains from about 0.05 to about 1.0 percent nitrate ions.*

*35. The process of claim 23 wherein the solution contains from about 0.05 to about 1.0 percent nitrate ions.*

*36. The process of claim 24 wherein the solution contains from about 0.05 to about 1.0 percent nitrate ions.*

*37. The process of claim 28 wherein the solution contains from about 0.025 to about 2 percent nitrate ions.*

*38. The process of claim 29 wherein the solution contains from about 0.025 to about 2 percent nitrate ions.*

*39. The process of claim 30 wherein the solution contains from about 0.025 to about 2 percent nitrate ions.*

*40. The process of claim 37 wherein the solution contains from about 0.025 to about 0.25 percent complex fluoride ions.*

*41. The process of claim 38 wherein the solution contains from about 0.025 to about 0.25 percent complex fluoride ions.*

*42. The process of claim 39 wherein the solution contains from about 0.025 to about 0.25 percent complex fluoride ions.*

*43. The process of claim 37 wherein the solution contains manganese ions.*

*44. The process of claim 38 wherein the solution contains manganese ions.*

*45. The process of claim 39 wherein the solution contains manganese ions.*

*46. The process of claim 37 wherein the solution contains from about 0.025 to about 0.25 percent of complex fluoride ions.*

*47. The process of claim 38 wherein the solution contains from about 0.025 to about 0.25 percent of complex fluoride ions.*

*48. The process of claim 39 wherein the solution contains from about 0.025 to about 0.25 percent of complex fluoride ions.*

*49. The process of claim 16 which further comprises contacting the zinc surface with at least one pretreating solution wherein the at least one pretreating solution contains less than about 0.01 percent chloride ions.*

*50. In a method for phosphate-coating a zinc surface wherein the surface is contacted with an aqueous, acidic solution, the improvement comprising:*

*suppressing the formation of white specking in said coating by contacting the zinc surface with an aqueous, acidic solution containing:*

*(a) about 0.5 to about 4 percent phosphate ion;*

*(b) an ion selected from the group consisting of zinc ions, manganese ions, and mixtures thereof;*

*(c) about 0.01 to about 1 percent complex fluoride ions; and*

*(d) chloride ions, wherein the weight:weight ration of complex fluoride ions:chloride ions in the solution is at a value of about 8:1 or above; and*

*maintaining said ratio at a value of about 8:1 or above during formation of the coating by adjusting the amount of complex fluoride ion in the solution thereby suppressing white specking.*

* * * * *